United States Patent Office 3,300,447
Patented Jan. 24, 1967

3,300,447
PROCESS FOR REDUCING THE ACID NUMBER OF POLYESTERS
Wilhelm Thoma, Cologne-Flittard, and Heinrich Rinke, Leverkusen, Germany, assignors to Farbenfabriken Bayer Aktiengesellschaft, Leverkusen, Germany, a German corporation
No Drawing. Filed Apr. 17, 1962, Ser. No. 188,272
Claims priority, application Germany, Apr. 25, 1961, F 33,748
5 Claims. (Cl. 260—75)

This invention relates to a process for reducing the acid number of polyesters which still contain free carboxyl groups.

Polyesters produced from polycarboxylic acids and polyhydric alcohols have some free carboxylic acid groups. It is difficult to cause the last of the carboxyl groups to react. In many applications, these residual —COOH groups are undesirable. For example, in the production of polyurethane castings by reacting the polyester with an organic polyisocyanate and a chain-extending agent, the residual —COOH groups will react with the polyisocyanate to yield $CO_2$ resulting in bubbles which weaken the casting.

Several methods of reducing the acidity of polyesters have been proposed heretofore. One method is to react the polyester containing carboxyl groups with an alkylene carbonate such as ethylene carbonate or glycerol carbonate. Such a process is disclosed in U.S. Patents 2,723,286 and 2,863,854. This process works very well for reduction of highly acid polyesters to a relatively low acid number as from an acid number of 90 to an acid number of 20. "Acid number" as used throughout is the number of milligrams of KOH necessary to neutralize one gram of polyester. But, it is far more difficult to reduce the acid number from 4 to 1 or from 2 to 0.5 than from 90 to 20. It is in this range that the heretofore known processes are not satisfactory because they require a catalyst which remains to contaminate the product and because elevated temperatures are required, usually above 150° C. and often above 200° C. Even with catalysts and temperatures above 150° C., the reaction time is often as long as six hours. Moreover, new —OH groups are introduced into the polyester from the reaction with the alkylene carbonate. If the reaction is not stopped at a relatively high acid number, further esterification takes place at the high temperature used and in the presence of the catalyst so that a severe overall reduction in —OH groups takes place. Thus according to this prior process, one cannot predetermine the hydroxyl number and composition of the polyester with reasonable accuracy. Either the acid number will remain high or the composition and hydroxyl number cannot be forecast. Still further the reaction of ethylene carbonate, for example, with acid groups is inefficient. Acetic acid reacted with ethylene glycol, even in the presence of concentrated sulfuric acid as a catalyst, gives a yield of only about 73 percent.

German Patent 1,093,797 proposes to reduce the acid number of polyesters by reacting the carboxyl groups with diethyl pyrocarbonic acid esters. This reaction leaves an ester group and no functional group as a replacement. Thus, a linear polyester would become monofunctional and therefore useless for reaction with an organic polyisocyanate to form polyurethanes. The reaction may be illustrated as follows:

HO-polyester—COOH + $C_2H_5$—O—CO—O—CO—O—$C_2H_5$ ⟶
HO-polyester—CO—O$C_2H_5$ + 2$CO_2$ + $C_2H_5$—OH It is therefore an object of this invention to provide a process for reducing the acid number of polyesters which is substantially devoid of the foregoing disadvantages. Another object of this invention is to provide a method of reducing the acidity of polyesters without changing the number of free hydroxyl groups thereof. A further object of this invention is to provide a method of reducing the acidity of polyesters at relatively low temperatures. Still another object of this invention is to provide an easy method of obtaining relatively low acid numbers in polyesters. Still another object of this invention is to provide a method of reducing the acidity of polyesters which avoids the necessity of using a catalyst. A further object of this invention is to provide an agent for reducing the acidity of polyesters and low acidity polyesters obtained by the use of said agent.

The foregoing objects and others which will become apparent from the following description are accomplished in accordance with this invention, generally speaking, by providing a method of reducing the acidity of polyesters wherein a polyester having a higher acidity than is desired is reacted with a compound which contains at least two groups having the formula

R—O—CO—O—CO—O— wherein R is a lower alkyl radical. The reaction between the polyester and the compound containing the above-identified groups can be carried out at a relatively low temperature between about 20 and about 150° C. and preferably between about 50 and about 80° C. Furthermore, the reaction may be carried out in the absence of a catalyst and still further, the reaction mechanism is different than that which uses diethyl pyrocarbonic acid since the number of hydroxyl groups and the composition of the polyester can be predetermined with accuracy. This avoids the difficulties of the prior art set forth above and is especially important for reducing the acid number of unsaturated polyesters. The reaction mechanism of this invention may be illustrated as follows:

HO-polyester—COOH + R—O—CO—O—CO—O—(R'—O—CO—O—CO—O—)$_n$R ⟶
HO-polyester—COOR'—OCO-polyester—OH + 4$CO_2$ + 2R—OH In the foregoing formulas, $n$, R and R' have the meanings set forth below.

Any suitable polyester obtained by the conventional reaction between a polyhydric alcohol and a polycarboxylic acid may be used. Any suitable polycarboxylic acid may be used such as, for example, oxalic acid, malonic acid, succinic acid, glutaric acid, adipic acid, pimelic acid, suberic acid, azelaic acid, sebacic acid, brasylic acid, thapsic acid, maleic acid, fumaric acid, glutaconic acid, alpha-hydromuconic acid, beta-hydromuconic acid, alpha-butyl-alpha-ethyl-glutaric acid, alpha,beta-diethylsuccinic acid, o-phthalic acid, isophthalic acid, terephthalic acid, hemimellitic acid, trimellitic acid, trimesic acid, mallophanic acid, prehnitic acid, pyromellitic acid, citric acid, benzene-pentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, butene-1,4-diol, 1,5-pentane diol, 1,4-pentane diol, 1,3-pentane diol, 1,6-hexane diol, 3-methyl-hexane-1,6-diol, hexane-1,6-diol, 1,7-heptane diol, diethylene glycol, diol tetramethylene ether, glycerine, trimethylolpropane, 1,3,6-hexanetriol, triethanolamine, pentaerythritol, sorbitol and the like. Of course, polyesters include polyester amides such as those obtained by including some amine in the reactants such as, for example, piperazine, ethanolamine, omega-aminoundecanoic acid and the like. Where ether alcohols are used, the resulting polyether-esters are within the scope of "polyesters" also.

The polyesters which have a molecular weight of from about 500 to about 10,000 and hydroxyl numbers of from about 25 to about 600 with initial acid numbers below about 100 are preferred. In a preferred embodiment of the invention, a polyester having an initial acid number greater than about 1 and less than about 5 is reacted until it has an acid number below about 1. The final acid number of the polyester may be reduced to substantially zero.

Any suitable compound which contains the grouping R—O—CO—O—CO—O—, wherein R is a lower alkyl radical, may be used. It is preferred to use compounds having the formula

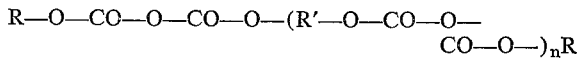

wherein R is a lower alkyl radical, R' is alkylene, arylene, aralkylene, alkylene and arylene interrupted by oxygen or sulfur ether linkages and the like and $n$ is 1 to 3 and preferably 1. Any suitable lower alkyl radical may be the radical represented by R in the foregoing formula such as, for example, methyl, ethyl, isopropyl, n-propyl, butyl, isobutyl, amyl, hexyl and the like. Any suitable alkylene radical may be the radical represented by R' in the foregoing formula and preferably contain from 1 to 12 carbon atoms such as, for example, methylene, ethylene, propylene, butylene, amylene, hexylene, heptylene, octylene, nonylene, decylene, 2,2-propylene, undecylene, 1,12-dodecylene and the like. Any suitable arylene radical may be used and preferably the arylene radicals only contain 1 or 2 benzene ring systems which may be either fused or separate. Suitable arylene radicals are therefore phenylene and preferably p-phenylene, naphthylene and preferably 1,5-naphthylene tolylene and the like. Any suitable aralkylene radical may be used and preferably contains only 1 or 2 benzene ring systems with alkylene radicals bonded thereto which preferably contain 1 to 12 carbon atoms. Suitable aralkylene radicals are therefore

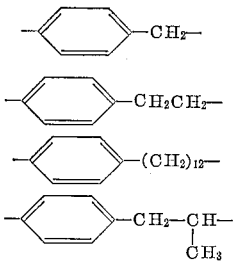

and the like.

Any suitable radical containing alkylene and/or arylene groups interrupted by oxygen and/or sulfur ether atoms may be used. Here also, the alkylene radicals preferably contain from 1 to 12 carbon atoms and may be simple or mixed. The arylene radicals preferably contain 1 or 2 benzene ring systems and may be either fused or not. Suitable radicals of this type are, for example, the radical obtained by removing the terminal hydroxyl groups from diethylene glycol or thiodiglycol. Alternately, a suitable radical of this type may be obtained by removing the terminal hydroxyl groups from bis-p-hydroxy phenyl ether or thioether. Still another type of radical which may be used is that made up of both alkylene and arylene radicals separated by oxygen or sulfur ether atoms such as the radical obtained by removing the hydroxyl groups from the bis(beta-hydroxy ethyl ether) of hydroquinone or

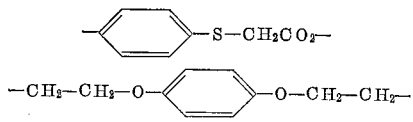

or the like.

It is to be understood that any of the radicals represented by R or R' in the foregoing formulas can be substituted with any non-interfering member or group such as halogen, for example, chlorine, bromine and the like and that the inclusion of such groups is in the scope of the invention. These pyrocarbonic acid esters may be prepared from sodium salts of alkyl-carbonic acids by reaction with bis-(chlorocarbonic acid) esters in acetone. The preparation of bis-carbonic acid esters can be found in Liebigs Annalen 624, 30 (1959). A particularly preferred compound is 1,4-butane-bis-ethyl pyrocarbonic acid ester.

The reaction as illustrated above lengthens the chain of the polyester but it yields a polyester which is at least polyfunctional. The lengthening of the chain is therefore much less when a polyester having a small acid number is used in the invention. It is particularly preferred to use polyesters which initially have an acid number below about 5 for the purpose of reducing the acid number to a value below about 1 because here the chain lengthening reaction will not be significant in the final product. This is apparent from a study of the following table in which a polyester having the acid number shown in the table is reacted in accordance with the invention with 1,4-butane-bis-ethyl pyrocarbonic acid ester:

TABLE

| Polyester | Before the reaction | | After the reaction | |
|---|---|---|---|---|
| | 1 | 2 | 1 | 2 |
| Acid Number | 1.8 | 4.7 | 0.5 | 0.4 |
| OH Number | 49.5 | 71.5 | 49.9 | 69.1 |
| Molecular Weight | 2,180 | 1,480 | 2,220 | 1,600 |

It can be seen that the molecular weight of the polyesters was not significantly increased by the treatment. The reaction time may vary from about 30 minutes to about 6 hours and is preferably from about 1 to about 4 hours. A large excess of the compound containing pyrocarbonic acid ester groups should be used, preferably however, not more than 100 percent excess is used. The excess is converted during the reaction with the formation of carbon dioxide into a carbonate. This carbonate and also the alcohol formed in the reaction is preferably removed by vacuum distillation. According to a preferred embodiment of the invention, the polyester is reacted immediately after preparation while it is still in the melt stage with the above-described bis-pyrocarbonic acid esters. It is also possible to work in solution, however. Suitable inert solvents are, for example, esters such as ethyl acetate, butyl acetate, and the like, cyclohexanone and the like, and aromatic hydrocarbons such as benzene, xylene, toluene and the like.

The polyesters of the invention are useful in all of the areas where polyesters were heretofore used but are particularly useful for the production of poylurethane plastics and most preferably polyurethanes of the elastomer type where low acid numbers are essential. The resulting elastomers may be used for the preparation of gear wheels and the like.

The invention is further illustrated by the following examples in which the parts are by weight unless otherwise specified.

*Example 1*

About 100 parts of a polyester of ethylene glycol and adipic acid (OH number about 49.5, acid number about 1.8) are heated for about 4 hours to about 75° C. with about 2.0 ml. of 1,4-butane-bis-ethyl-pyrocarbonic acid ester (purity about 99 percent). In order to remove the alcohol split off and the butanediethyl carbonate formed from the excess of the pyrocarbonic acid ester, a vacuum of about 0.5 to about 1.0 mm. is applied for about one and one-half hours at about 150° C. The polyester thus treated then has an OH number of about 49.9 and an acid number of about 0.5.

The 1,4-butane-bis-ethyl-pyrocarbonic acid ester is prepared by running about 50 parts of 1,4-butane-bis-chlorocarbonic acid ester into a suspension of about 57 parts of finely ground sodium ethyl carbonate in about 150 ml. of acetone dried over calcium chloride at about 40° C. and stirring the reaction mixture for about 6 hours at about 50° C. The product is freed by filtration from the common salt and excess carbonic acid salt, the acetone is distilled off in vacuo and the bis-pyroester is obtained in a purity of about 99 percent which is determined titrimetrically with N/10-diisobutylamine solution in chlorobenzene (with respect to bromophenol blue).

*Example 2*

About 100 parts of a polyester amide of methyl hexanediol, piperazine (9:1) and adipic acid (OH number about 71.5, acid number about 4.7) are heated with about 4.0 ml. of 1,5-butane-bis-ethyl-pyrocarbonic acid ester for 4 hours to about 75° C.

The further processing is in accordance with Example 1. The product of the process has an OH number of about 69.1 and an acid number of about 0.4.

While certain polyesters and bis-pyrocarbonic acid esters are used in the foregoing working examples, it is to be understood that these examples are given merely for the purpose of illustration and that any other suitable polyester could have been used in the working examples providing that the teachings of the disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:
1. The method of reducing the acidity of polyesters having an acid number greater than about 1 and less than about 5 to an acid number below about 1 which comprises heating said polyester to a temperature within the range of from about 20° C. to about 150° C. with sufficient of a compound having the formula

R—O—CO—O—CO—O—(R'—O—CO—O—CO—O—)$_n$R wherein R is a lower alkyl radical, R' is selected from the group consisting of alkylene, arylene, aralkylene and alkylene and arylene radicals interrupted by ether atoms selected from the group consisting of oxygen and sulfur and $n$ is an integer of 1 to 3 to reduce the acidity of said polyester to an acid number below about 1.

2. The method of claim 1 wherein $n$ is 1.
3. The method of claim 1 wherein the temperature is within the range of about 50° C. to about 80° C.
4. The method of claim 1 wherein the heating is continued for at least about 30 minutes.
5. A method of reducing the acidity of a polyester prepared by a process which comprises condensing a polycarboxylic acid and a polyhydric alcohol, said polyester having a molecular weight within the range of from about 1000 to about 10,000 and an acid number greater than about 1 and less than about 5 which comprises heating said polyester to a temperature within the range of from about 20° C. to about 150° C. with sufficient 1,4-butane-bis-ethyl pyrocarbonic acid ester to reduce the acidity of said polyester to an acid number below about 1.

References Cited by the Examiner

UNITED STATES PATENTS

| | | | |
|---|---|---|---|
| 2,711,997 | 6/1955 | Trieschmann et al. | 260—463 |
| 2,863,854 | 12/1958 | Wilson | 260—75 |
| 3,078,294 | 2/1963 | Howe et al. | 260—453 |

FOREIGN PATENTS

| | | |
|---|---|---|
| 1,044,406 | 11/1958 | Germany. |
| 1,093,797 | 12/1960 | Germany. |

OTHER REFERENCES

Boehm et al.: Ber. Deut. Chem. 71B, 1797–1802 (1938).

LEON J. BERCOVITZ, *Primary Examiner.*

R. W. GRIFFIN, *Assistant Examiner.*